United States Patent
Lennox et al.

(10) Patent No.: US 10,858,834 B2
(45) Date of Patent: Dec. 8, 2020

(54) HEAT SHRINK COVERING OF BUILT STRUCTURES AND METHOD

(71) Applicant: SYSTEM STORMSEAL PTY LTD, Rockdale (AU)

(72) Inventors: Matthew Lennox, Rockdale (AU); Justin Gallagher, Rockdale (AU); Andrew Markopoulos, Rockdale (AU)

(73) Assignee: SYSTEM STORMSEAL PTY LTD, Rockdale (AU)

( * ) Notice: Subject to any disclaimer, the term of this patent is extended or adjusted under 35 U.S.C. 154(b) by 136 days.

(21) Appl. No.: 16/071,911

(22) PCT Filed: Nov. 30, 2016

(86) PCT No.: PCT/IB2016/001692
§ 371 (c)(1),
(2) Date: Jul. 23, 2018

(87) PCT Pub. No.: WO2017/125780
PCT Pub. Date: Jul. 27, 2017

(65) Prior Publication Data
US 2019/0055734 A1 Feb. 21, 2019

(30) Foreign Application Priority Data
Jan. 22, 2016 (AU) .................. 2016200398

(51) Int. Cl.
*E04D 12/00* (2006.01)
*B29C 65/10* (2006.01)
(Continued)

(52) U.S. Cl.
CPC ............ *E04D 12/002* (2013.01); *B29C 65/10* (2013.01); *B29C 66/1122* (2013.01);
(Continued)

(58) Field of Classification Search
CPC ............ B29C 66/86533; B29C 66/836; B29C 66/1122; B29C 65/10; B29C 66/73715;
(Continued)

(56) References Cited

U.S. PATENT DOCUMENTS 3,257,257 A   6/1966  Werner et al.
4,725,328 A * 2/1988  Arnold .................. B29C 65/106
                                              156/380.9
(Continued)

FOREIGN PATENT DOCUMENTS

AU    2008203409    12/2008
AU    2009200232     5/2009
(Continued)

OTHER PUBLICATIONS

Bonnington Square Bed and Breakfast "How to join two polyethylene sheets with a heat gun" <URL: https://www.youtube.com/watch?v=5Zrszp62fwM&lc=z12qjlbw1mqdf1rit04chtv4lzq5yhhimbg.1446728017851243> Published on Nov. 11, 2014, Whole Video.
(Continued)

*Primary Examiner* — Adriana Figueroa
(74) *Attorney, Agent, or Firm* — Mark M. Friedman

(57) ABSTRACT

A system for providing covers for surface areas of built structures; the system including a film of heat shrinkable material for stretching and heat shrinking over one or more of the surfaces of the built structure; the film formed as a sheet comprising an assembly of lengths of the heat shrinkable material prepared on a supporting surface; characterized in that the sheet is prepared by applying heat to overlap portions between adjoining lengths of the heat shrinkable material while the overlap portions are secured in contact between the supporting, surface and a guide rail assembly laid over the overlap portions; the overlap portions welded together by a heat gun moveable along the guide rail
(Continued)

assembly at a predetermined distance above the overlap portions.

12 Claims, 12 Drawing Sheets

(51) Int. Cl.
    *B29C 65/00*         (2006.01)
    *B29L 31/10*         (2006.01)

(52) U.S. Cl.
    CPC .. *B29C 66/73715* (2013.01); *B29C 66/86533* (2013.01); *B29C 66/348* (2013.01); *B29C 66/43* (2013.01); *B29C 66/73921* (2013.01); *B29C 66/836* (2013.01); *B29L 2031/108* (2013.01)

(58) Field of Classification Search
    CPC . B29C 66/348; B29C 66/43; B29C 66/73921; E04D 12/002; B29L 2031/108
    USPC ................................ 52/3, 746.11; 156/84, 85
    See application file for complete search history.

(56) References Cited

U.S. PATENT DOCUMENTS

| | | | | |
|---|---|---|---|---|
| 4,834,828 A | * | 5/1989 | Murphy | B29C 65/103 156/359 |
| 4,872,941 A | * | 10/1989 | Lippman | B29C 65/10 156/497 |
| 5,624,511 A | * | 4/1997 | Lippman | B29C 65/7835 156/157 |
| 5,935,357 A | * | 8/1999 | Hubbard | B29C 66/1122 156/497 |
| 5,969,292 A | * | 10/1999 | Snider, Jr. | H02G 3/0443 174/498 |
| 6,425,213 B1 | | 7/2002 | Lachapelle | |
| 6,588,475 B1 | * | 7/2003 | Simon, Jr. | B29C 65/10 126/271.1 |
| 6,616,791 B2 | * | 9/2003 | Nagato | B32B 27/12 156/157 |
| 2005/0021720 A1 | | 1/2005 | Sawada | |
| 2012/0186722 A1 | * | 7/2012 | Lennox | E04G 21/28 156/85 |
| 2014/0000198 A1 | * | 1/2014 | Forsstrom | B29C 66/474 52/309.1 |

FOREIGN PATENT DOCUMENTS

| | | | | |
|---|---|---|---|---|
| DE | 1958989 A1 | * | 6/1970 | .......... B29C 65/782 |
| EP | 1393882 A | | 3/2004 | |
| EP | 1464471 A | | 10/2004 | |
| JP | H081119 B2 | * | 1/1996 | ......... B29C 65/8246 |
| WO | 2009146487 | | 12/2009 | |
| WO | 2009146487 A | | 12/2009 | |

OTHER PUBLICATIONS

Bonnington Square Bed and Breakfast "How to join two polyethylene sheets with a heat gun" <URL: https://www.youtube.com/watch?v=5Zrszp62fwM&lc=z12qjIbw1mqdf1rit04chtv4Izq5yhhimbg.1446728017851243> Published on Nov. 11, 2014, Whole Video.

* cited by examiner

Material: Geomembrane(s)
TRI Log No.: A16-150

Sample Identification: Stormseal UV

| PARAMETER | TEST REPLICATE NUMBER | | | | | | | | | | MEAN | STD. DEV. |
|---|---|---|---|---|---|---|---|---|---|---|---|---|
| | 1 | 2 | 3 | 4 | 5 | 6 | 7 | 8 | 9 | 10 | | |
| Thickness (ASTM D 5199) | | | | | | | | | | | | |
| Thickness (mm) | 0.22 | 0.20 | 0.20 | 0.22 | 0.20 | 0.22 | 0.22 | 0.20 | 0.20 | 0.22 | 0.21 | 0.01 |
| | | | | | | | | | | | 0.20 | << min |
| Tensile Properties (ASTM D 6693, 2 ipm strain rate) | | | | | | | | | | | | |
| MD Yield Strength (N/mm) | 2.3 | 2.4 | 2.3 | 2.6 | 2.1 | | | | | | 2.3 | 0.2 |
| TD Yield Strength (N/mm) | 2.1 | 2.0 | 2.1 | 2.1 | 2.1 | | | | | | 2.1 | 0.1 |
| MD Break Strength (N/mm) | 4.2 | 4.1 | 3.2 | 5.3 | 3.0 | | | | | | 4.0 | 0.9 |
| TD Break Strength (N/mm) | 4.4 | 4.3 | 4.4 | 4.7 | 4.7 | | | | | | 4.5 | 0.2 |
| MD Yield Elongation (%) | 30 | 27 | 26 | 27 | 23 | | | | | | 27 | 3 |
| TD Yield Elongation (%) | 16 | 22 | 16 | 21 | 19 | | | | | | 19 | 3 |
| MD Break Elongation (%) | 461 | 428 | 315 | 534 | 326 | | | | | | 413 | 93 |
| TD Break Elongation (%) | 480 | 504 | 487 | 509 | 507 | | | | | | 497 | 13 |
| Puncture Resistance (ASTM D 4833) | | | | | | | | | | | | |
| Puncture Strength (N) | 94 | 94 | 86 | 93 | 95 | 92 | 91 | 96 | 91 | 88 | 92 | 3 |
| Tear Resistance (ASTM D 1004) | | | | | | | | | | | | |
| MD Tear Strength (N) | 22 | 22 | 23 | 21 | 20 | 22 | 22 | 24 | 17 | 22 | 21 | 2 |
| TD Tear Strength (N) | 21 | 20 | 23 | 17 | 21 | 21 | 21 | 22 | 19 | 20 | 20 | 2 |
| Determination of Seam Strength (AS3706.6) | | | | | | | | | | | | |
| MD Seam Strength (kN/m) | 2.2 | 2.2 | 2.2 | | | | | | | | 2 | 0 |
| Note: Seam failure did not occur | | | | | | | | | | | | |
| MD Machine Direction | TD Transverse Direction | | | | | | | | | | | |

Fig. 13

HEAT SHRINK COVERING OF BUILT STRUCTURES AND METHOD

The present invention relates to protective covering of roofs and walls of built structures by polymer sheeting and, more particularly, to the temporary covering of damaged or under construction roofs, or as permanent sarking under roof covering or wall cladding.

BACKGROUND

The use of polymer sheeting fox the protection of damaged roofs, or for weatherproofing buildings under construction, is known and was described for example in AU2009200232 and PCT/AU2009/000685 by the present inventor and the text of which is largely incorporated in this specification.

U.S. Pat. No. 6,425,213 (cited against an applicant's U.S. application Ser. No. 12/995,966) also describes a system of wrapping a building in a water impermeable layer but relies on the application of successive overlapping strips which are not secured one to another and would be liable to dislodgement in high wind conditions, and moreover is not for the repair of damaged roofs but as proofing against flooding.

Roofs are of course susceptible to damage from high winds, rain or hail. Tiled roofs for example may have a considerable area of tiles either damaged from hail impact, or dislodged completely as the result of high intensity storms. Shingled roofs are liable to be similarly damaged, and even metal sheeted roofs may suffer partial or total removal of one or more sheets. Damage to roofs may also be caused by the impact of falling trees, large branches, or other objects made airborne under high wind conditions.

Storm or impact damage cannot usually be immediately repaired so that to prevent further or potential damage to the interior of the building, temporary covering must be provided. Typically canvas (or similar material) tarpaulins are placed over the damaged part of the roof and secured to the structure by ropes.

One disadvantage of this method of temporary covering is the difficulty of adequately securing a tarpaulin to the roof so that they remain very vulnerable to dislodgement should high winds prevail or recur and often require continuing attention and adjustment. Moreover, they are heavy and awkward to position, posing occupational health and safety issues. A further disadvantage is that they are expensive to acquire and bulky to store, and if the many roofs are damaged in one storm event, the number of tarpaulins available may be inadequate.

Buildings under construction, particularly timber framed, brick clad dwellings, are frequently constructed in a sequence where the timber frame, including that of the roof, is completed a considerable time before the roof cladding can be added. A disadvantage of this construction technique is that during this period the timber of the structure, which may even include timber or particle board flooring, is liable to deterioration from water and sun. A further disadvantage of this sequence of construction is that, if rain intervenes at the time further internal work is scheduled, the lack of roof covering may cause considerable delay and financial loss.

A system of covering a roof with a film of material for the purpose of preventing damage from wind shear was disclosed in US 2005/0217202, although again this is therefore not directed at the covering after storm damage. Moreover this U.S. application teaches a method of application of the film from a roll of film hoisted up onto the roof surface, the film being unrolled in situ with overlapping edges of the film being secured by the application of adhesive tape. Rolls of film are heavy and in practice the manipulation of a roll of film and the edge taping required on even an intact roof surface is extremely difficult, if not dangerous and is completely impractical for application to the roof framing of an uncompleted building.

It is known for both damaged roofs and uncompleted framed roofs, to prepare sufficiently assembled strips of film at ground level for subsequent application to the roof, as disclosed in the present applicant's patent AU2008203409. In practice however, it has been found that the sealing of an extensively damaged roof, or the covering of a roof still under construction by a continuous sheet of film material, can lead to unacceptable stress at the seams and attached edges of the sheet. This stress is due to wind action both passing over the sheet surface, and acting on the sheet from below.

A further problem, not previously addressed, is that even at ground level, the assembly of a number or adjoining sheets of polymer film into a sheet large enough to cover a roof, especially in the case of storm damage, wind conditions make the control of adjoining sheets extremely difficult, U.S. Pat. No. 4,672,941 discloses a system for assembling by welding horizontally overlapping sheets of thermoplastic, but this involves a large, cumbersome wheeled machine which travels over the sheets. Another overlap welding arrangement is disclosed in U.S. Pat. No. 3,257,257 which again involves the use of a welding machine travelling along the overlap between adjacent sheets. Apart from the relatively complicated machine, the system relies on a well-defined trench built into a supporting surface for accommodating a conveyor belt system and is thus completely unsuited to on site use.

There is thus a need for simple, readily portable but efficient equipment to control overlapping sheets laid out on a ground surface at the site of application. In particular, for heat welding to provided consistent and strong joints, that simple equipment must provide for a controlled application of heat to the overlap portions of adjoining sheets applied at a predetermined rate.

It is an object of the present invention to address or at least ameliorate some of the above disadvantages.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in a first broad form of the invention, there is provided a system for providing covers for surface areas of built structures; the system including a film of heat shrinkable material for stretching and heat shrinking over one or more of the surfaces of the built structure; the film formed as a sheet comprising an assembly of lengths of the heat shrinkable material prepared on a supporting surface; characterized in that the sheet is prepared by applying heat to overlap portions between adjoining lengths of the heat shrinkable material while the overlap portions are secured in contact between the supporting surface and a guide rail assembly laid over the overlap portions; the overlap portions welded together by a heat gun moveable along the guide rail assembly at a predetermined distance above the overlap portions.

Preferably, the supporting surface is a ground surface.

Preferably, the supporting surface is a surface of a supporting element placed on a ground surface.

Preferably, the guide rail assembly comprises is spaced apart guide rail elements interconnected at their outer ends by connecting elements.

Preferably, the guide rail elements are provided with inward facing recesses.

Preferably, spacing between the guide rail elements is in the range of 15 to 30 mm.

Preferably, the supporting element comprises a length of heat resistant material.

Preferably, the supporting element is provided with a length of rope or cable attached to one end of the supporting element; the length, of rope or cable being at least the length of a length of overlap of two adjoining lengths of the heat shrinkable material.

Preferably, a heat gun is provided with a heat directing shroud; width of the heat directing shroud sized so as to fit between edges of the recesses provided in the guide rail elements of the guide rail assembly.

Preferably, a length of the heat directing shroud is sized to provide fusion of a portion of the overlap of the two adjoining lengths of heat shrinkable material in a predetermined time.

Preferably, consistency and quality of a weld is ensured by separation between the heat gun and the overlap of material and a predefined rate of travel of the heat gun along the guide rail.

Preferably, undersides of the rail elements of the guide rail assembly are provided with strips of a heat insulating material.

Preferably, at least one air vent is provided in any of the lengths of heat shrinkable material; the air vent comprising an aperture and an overlying cover.

Preferably, three sides of material comprising the overlying cover overlap three edges of the aperture and are welded to the surface of the length of heat shrinkable material; a fourth side of the overlying cover overlapping a fourth edge of the aperture by at least 300 mm.

In another broad form of the invention, there is provided a method of preparing a film of material for covering surfaces of a built structure; the film comprising an assembly of lengths of heat shrinkable material; the method including the step of applying heat along an overlap between adjoining lengths of the heat shrinkable material; characterized in that the application of heat is guided by a guide rail assembly; the guide rail assembly placed over a section of overlap lying on an elongate supporting element positioned on a ground surface.

Preferably, the method includes the steps of:
1) positioning the elongate supporting element on a ground surface.
2) extending a rope or cable attached at an end of the supporting element along an intended position of an overlap of two adjoining lengths of the heat shrinkable material,
3) positioning the two adjoining lengths of the heat shrinkable material with a predetermined overlap over the supporting element and the rope or cable,
4) positioning the guide rail assembly over a first overlap portion of the two adjoining lengths of the heat shrinkable material and coincident with the supporting element,
5) moving a heat gun provided with a heat directing shroud along the guide rail assembly to fuse the first overlap portion of the two lengths of heat shrinkable material together.

Preferably, subsequent overlap portions of the two adjoining lengths of heat shrinkable material are fused together by the steps of:
6) removing the guide rail assembly from the first or preceding overlap portion,
7) using the rope or cable to reposition the supporting element under a next overlap portion of the adjoining lengths of the heat shrinkable material,
8) positioning the guide rail assembly over the next overlap portion and coincident with the supporting element,
9) moving the heat gun provided with the heat directing shroud along the guide rail assembly to fuse the next overlap portion of the two lengths of heat shrinkable material together.

Preferably, the guide rail assembly comprises two spaced apart guide rail elements interconnected at their outer ends by connector elements.

Preferably, at least one air vent is provided in at least one length of the heat shrinkable material; the air vent comprising a pre-cut aperture in the length of heat shrinkable material and a cover; three sides of the cover overlapping three edges of the aperture and welded to the length of heat shrinkable material; a fourth side of the cover over lapping a fourth edge of the aperture by at least 300 mm.

In a further broad form of the invention, there is provided a method of preparing an assembly of sheets of a heat shrinkable material on a ground surface; the assembly of sheets prepared for covering one or more surfaces of a built structure; the method including locating overlapping lengths of adjacent strips of the heat shrinkable material between a supporting surface and a guide rail assembly placed over the overlapping lengths; a heat source movable along the guide rail assembly at a predetermined rate heat welding the overlapping lengths to form the assembly of sheets.

Preferably, the heat source is a heat gun mounted on a trolley adapted for movement along rails comprising the guide rail assembly.

Preferably, the trolley is powered to give a controlled rate of movement along the rail system.

In another broad form of the invention, there is provided a method of covering a storm damaged area of a roof of a built structure; the method includes the step of preparing an assembly of sheets of a heat shrinkable material on a ground surface; the method including sequentially applying the steps of:
1) arranging a two adjoining sheets of the heat shrinkable material with an overlap over a supporting surface;
2) securing the first portion of the overlap by placing a guide rails assembly over the first portion of the overlap,
3) applying heat to the first portion of the overlap by moving a heat source along the guide rail assembly to weld overlap portions of the sheets along the first overlap portion together,
4) sequentially moving the guide rail assembly to subsequent portions of the overlap to weld subsequent overlap portions together to a required length of the assembly of sheets of heat shrinkable material.

Preferably, the method includes the further steps of:
1) pulling the assembly of sheets onto the roof surface to cover at least the storm damaged area of the roof,
2) attaching at least opposing edges of the assembly of sheets to battens, 3) securing the battens at the opposing edges of the assembly of sheets to any one of eaves, facia boards or roof battens.

Preferably, the guide element is a guide rail assembly; the guide rail assembly structured to constrain movement of the heat source along the portion of the overlap at a predetermined separation above the heat shrinkable material.

In another broad form of the invention, there is provided a method of preparing a sarking layer for a built structure; the sarking layer comprising an assembly of sheets of a heat shrinkable material; the method including the steps of:
1) positioning a portion of an overlap between two adjoining sheets of the heat shrinkable material on a supporting surface,
2) positioning a guide rail assembly over a first portion of the overlap to secure the first portion of the overlap between the supporting surface and the guide rail assembly,
3) moving a heat source along the guide rail assembly to heat weld the overlap portions of the adjoining sheets of heat shrinkable material one to another,
4) moving the guide rail assembly to a next overlapping portion of the adjoining sheets of heat shrinkable material and repeating step 3 until a required length of the assembly of sheets of heat shrinkable material is reached,
5) adding a further adjoining sheet of heat shrinkable material to form a further overlap portion and repeating steps 1 to 4 until a required width of the assembly of sheets of heat shrinkable material is reached.

In still a further broad form of the invention, there is provided a method of temporarily waterproofing a storm damaged area of a roof of a built structure by securing an assembly of sheets of heat shrinkable material to at least a portion of the roof surface; the assembly of sheets prepared by heat welding overlap portions of adjoining sheets; the method including the steps of securing sequential overlap portions of the adjoining sheets between a supporting surface and a guide rail assembly, and passing a heat source along the guide rail assembly.

Preferably, the method includes the further steps of:
1) pulling the assembly of sheets of heat shrinkable material onto the roof surface to cover the storm damaged area,
2) securing battens to at least two opposing edges of the assembly of sheets of the heat shrinkable material,
3) securing the battens to eaves, facia boards or roof battens,
4) applying the heat source to the heat shrinkable material to tightly conform the assembly of sheets to the roof surface.

In still a further broad form of the invention, there is provided a method of preparing and securing an assembly of sheets of heat shrinkable material over a damaged section of a roof surface; the method including the steps of:
1) drawing and cutting from a roll of the heat shrinkable material a required number of sheets at a required length to cover the damaged section,
2) arranging on a supporting surface adjoining lengths of the heat shrinkable material with a predetermined overlap,
3) placing a guide rail assembly over a first portion of the overlap to secure the first portion of the overlap between the supporting surface and the guide rail assembly,
4) moving a heat source along the guide rail assembly to weld respective overlap portions of the adjoining sheets one to the other,
5) moving the guide rail assembly to any required subsequent portions of the overlap and repeating step 4 to complete welding of the overlap,
6) adding as required further lengths of the heat shrinkable material and repeating steps 2 to 5 to complete the assembly of sheets,
7) pulling the assembly of sheets with the battens onto the roof surface to cover the damaged section of the roof surface,
8) affixing battens to at least two opposing edges of the assembly of sheets,
9) affixing the battens at the two opposing edges of the assembly of sheets to suitable elements of the roof,
10) applying the heat source to the surface of the assembly of sheets to tighten the heat shrinkable material into conformity with the roof surface.

Preferably, the supporting surface is a ground surface.

Preferably, the supporting surface is the upper surface a length of heat resistant material substantially coextensive with the guide rail assembly.

Preferably, the length of heat resistant material is pulled from the first portion of the overlap to subsequent portions of the overlap by a rope or cable extending from the length of heat resistant material.

In another broad form of the invention, there is provided a kit for temporary repair of a storm damaged roof or other surface of a built structure; the kit comprising a box enclosing at least one roll of heat shrinkable material, a heat source and a guide rail assembly.

Preferably, the roll or rolls of heat shrinkable material are rotatably mounted within the box enabling lengths of the heat shrinkable material to be drawn from the box for use.

The kit of claim 33 or 34 wherein the heat shrinkable material is wound onto the roll or rolls in a twice folded state; the width of the heat shrinkable material when spread out after cutting from a roll approximately equal to three times the width of the roll.

Preferably, adjacent lengths of the heat shrinkable material are spread on a supporting surface with a predetermined overlap of one length of the heat shrinkable material over the other; the guide rail assembly positioned over a first overlap portion of the overlap and the heat source moved along the guide rail assembly to weld the adjoining lengths along the first overlap portion.

BRIEF DESCRIPTION OF DRAWINGS

Embodiments of the present invention will now be described with reference to the accompanying drawings wherein:

FIG. 13 is an extract from a laboratory test report on performance characteristics of the heat shrinkable material.

DETAILED DESCRIPTION OF PREFERRED EMBODIMENTS

The roof cover system of the present invention provides for a system and method for covering a damaged or uncompleted roof of a building. The system uses a heat shrinkable film, preferably a low-density polyethylene containing shrinking resins, UV inhibitors, anti brittling compounds, fire retardant additives and strengtheners for tear resistance. The film is preferably between 100 and 500 microns in thickness, though most preferably 200 microns, and is provided in rolls of various widths and lengths. In at least one preferred form of the film, it is provided with a heat reflective surface. A preferred specification for the film is given at the end of the description.

First Preferred Embodiment

Figure 1:
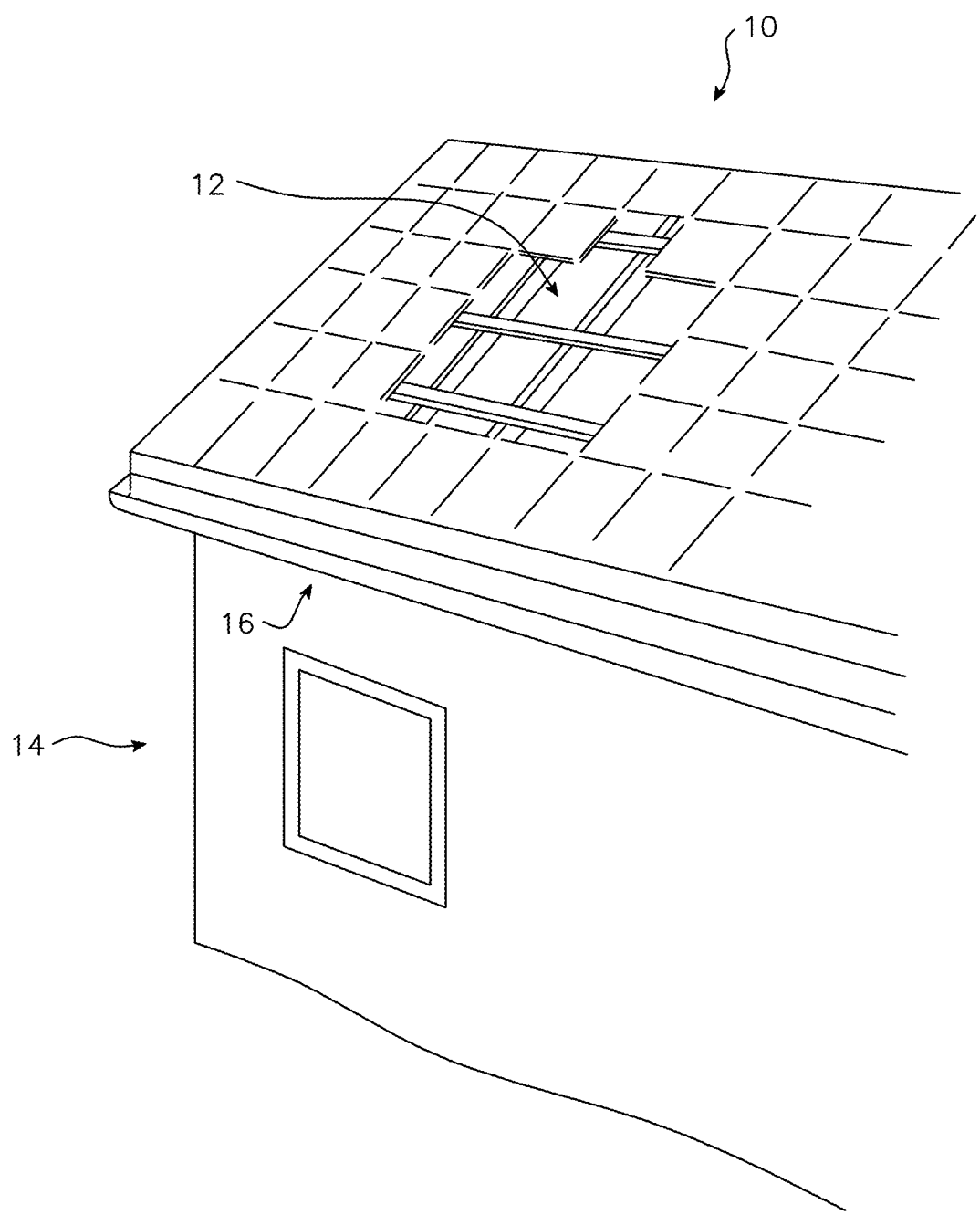
FIG. 1 is a perspective view of a portion of a building of which the roof has sustained damage.

With reference now to FIG. 1, typical damage to a tiled roof 10 of a building 12 may include the loss of a number of tiles 12 due to a high wind shear event, leaving the building 14 open to the ingress of water. Water ingress may also occur if tiles are cracked for example from heavy hail impact or falling trees or branches. Emergency temporary repair is provided by the roof cover system of the invention by applying the above described film over that portion of the roof which has sustained damage.

If required, sharp edges protruding from the roof surface may first be covered with suitable wadding and adhesive tape to prevent possible tearing of the film during application.

Figure 2:
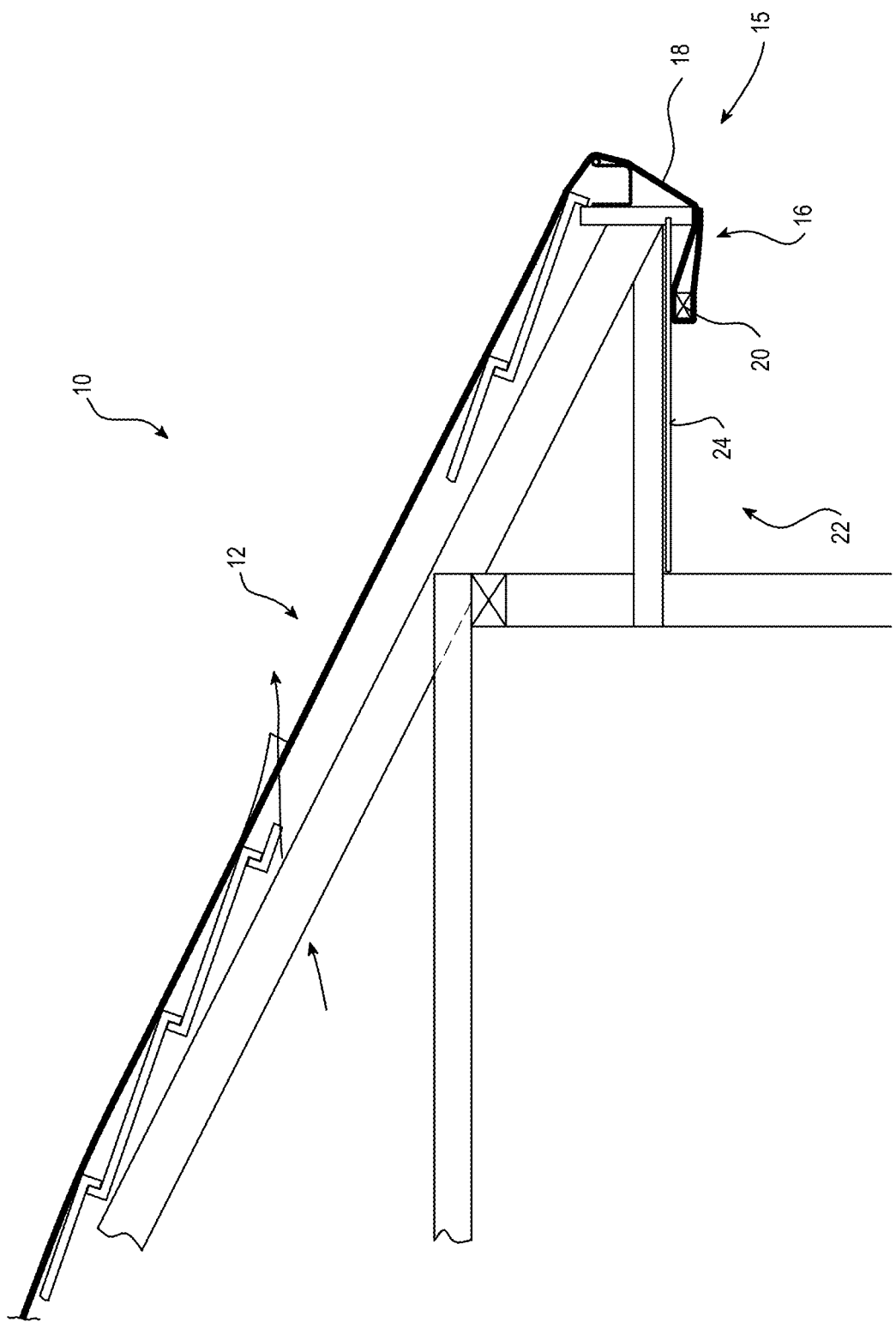
FIG. 2 is a side sectioned view of a portion of a building and existing roof structure to which has been applied a roof cover system according to the invention.
Figure 11:
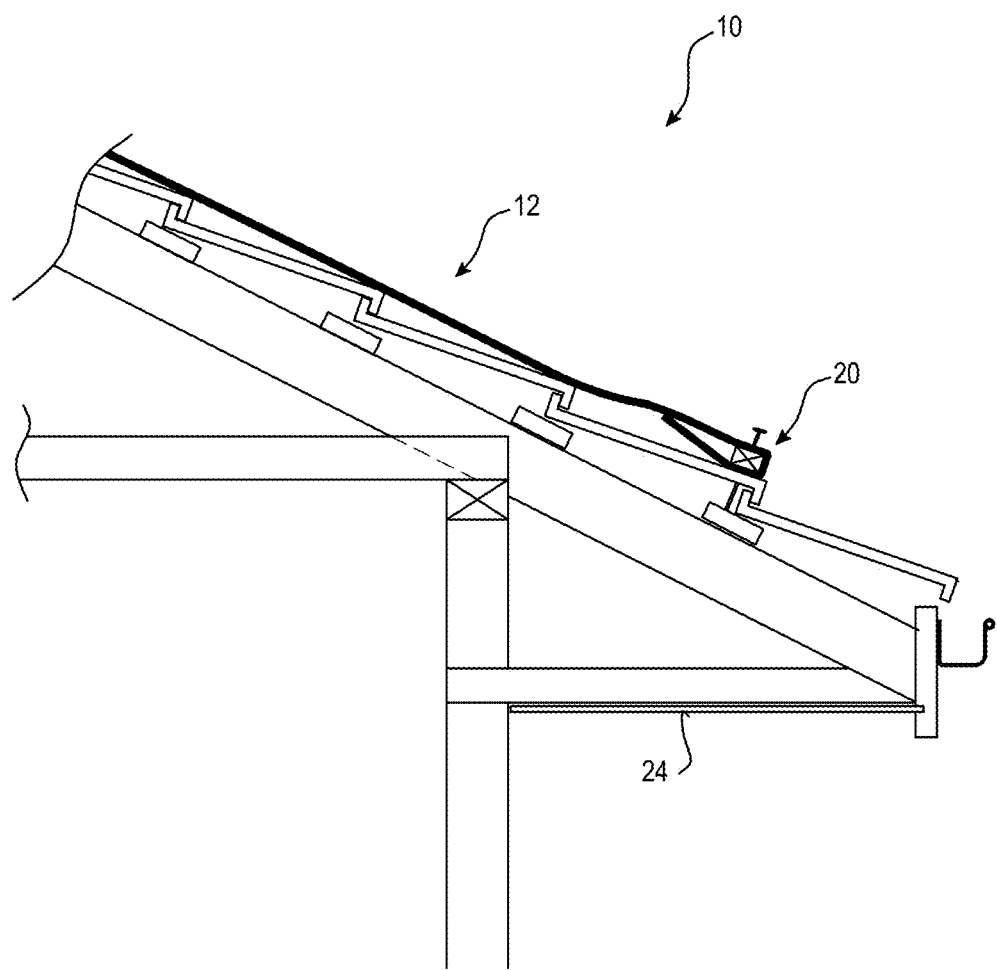
FIG. 11 is a further cross section view of a roof of a building showing an alternative method of securing a roof cover according to the invention to the roof.

The extent of roof to be covered is measured and the most suitable available width roll of the heat shrinkable film selected. Film is cut to one or more lengths sufficient to extend from one edge of the roof to an opposite edge. With reference to FIG. 2, a trailing edge of a length of film is mechanically attached at the first edge 16 of the roof 10. In one preferred method as shown in FIG. 2, the trailing edge 15 of the film 18 is wrapped once around a length of batten 18, preferably as long as the width of the film, and the batten 20 mechanically fixed to the underside 22 of the eaves 24 at the first edge of the roof 10. In still another possible arrangement, the batten 20 can be fixed directly to an existing batten through the roof tiles, as shown in FIG. 11.

The leading edge is now passed over the roof to the opposite edge (not shown) of the roof and the leading edge secured to the opposite side eaves in similar manner to that already described. If the outer side edge of the length of film adjoins an edge of the roof, this may be similarly secured under the eaves along that side of the roof. Alternatively, the leading edge may be secured to the barge or fascia boards.

Heat is now applied to the film at the underside of the eaves 24 with a heat gun (not shown) to cause the film 18 to shrink securely around the batten and the undersides of the eaves. The heat gun, now attached to an extension arm (not shown), is then used to apply heat to at least a region around the perimeter of the film 18 stretched over the roof surface, causing it to tightly conform to the surface and covering missing or cracked tiles 12.

If the extent of the damage requires, successive lengths of film can be applied side by side with an overlap of preferably 150 to ro300 mm. Heat is applied along these overlaps to seal the edges of the adjoining lengths together.

Valley areas and other discontinuities in the roof surface can be accommodated by cutting film to suit the area involved and heat sealing to adjoining film length edges. Vertical roof penetrations, such as chimney stacks ventilators and the like, are sealed by preferably a 300 mm rise of film. Edges of riser sections of film can be taped or cable-tied to the penetration.

By the above means, a damaged roof can be rapidly and securely covered to prevent water ingress and damage to the inside of the building. Unlike tarpaulins which are difficult to secure and remain liable to dislodgement in high winds, the heat shrinkable film by conforming closely to the roof surface, provides a secure seal over the damage until permanent repairs can be made.

Second Preferred Embodiment

In a second preferred embodiment of the invention, a damaged section of a roof to be temporarily protected prior to permanent repair, is again covered by a heat shrinkable film. In this embodiment however, the method of application is different.

Figure 5:
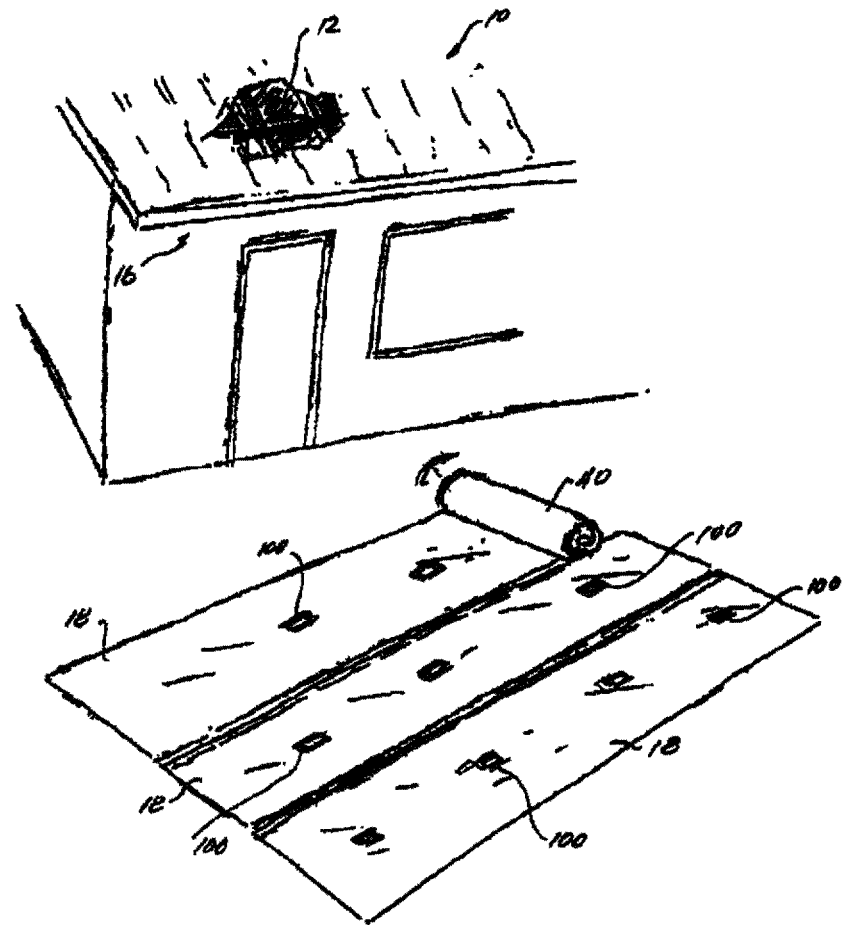
FIG. 5 is an illustration of the preparation of a sheet of heat shrinkable material prepared on a ground surface as an assembly of lengths of material taken from a roll of film.

Instead of attempting to apply individual lengths of film, attaching a length at a first end to the eaves at one side of the roof, stretching the length over the roof to be attached at the eaves at the opposite side, and taping the edges of adjoining lengths of film together, the method of this embodiment, with reference to FIG. 5 is as follows:

(a) the location of the damaged section 12 of roof 10 is assessed in relation to the nearest opposing edges of the roof, (b) the length of film required to extend between the opposing roof edges is estimated, allowing for overhang and fixing requirements, (c) the width of the damaged area is ascertained and the number of lengths of the available film required to cover and overlap the damaged area determined, (d) the number of lengths of material 18 is then cut from a roll 40 of the film and laid out side by side on the ground, (e) while on the ground, adjoining edges of the lengths of film are taped to form a waterproof assembled sheet of heat shrinkable film, sufficient to stretch from one roof edge to the opposite roof edges and of sufficient width to cover the damaged area.

This assembled sheet is now pulled up onto the roof, positioned so as to cover the damaged area and outer ends fastened in similar manner as previously described above.

An advantage of this method is that there is no need to lift a relatively heavy roll of heat shrinkable material onto the roof and unroll it one what may be quite steep surfaces. Moreover it has been found in practice that the arrangement described in the first preferred embodiment above of taping the edges of adjoining lengths of the material together on the roof is both difficult and dangerous. This is especially so if the damage to the roof is extensive and perhaps been rendered structurally unsafe. The method of the present described embodiment minimises activity on the roof surface, requiring only that one edge of the sheet of material be carried over the roof from a first edge to an opposite edge.

Third Preferred Embodiment

Figure 3:
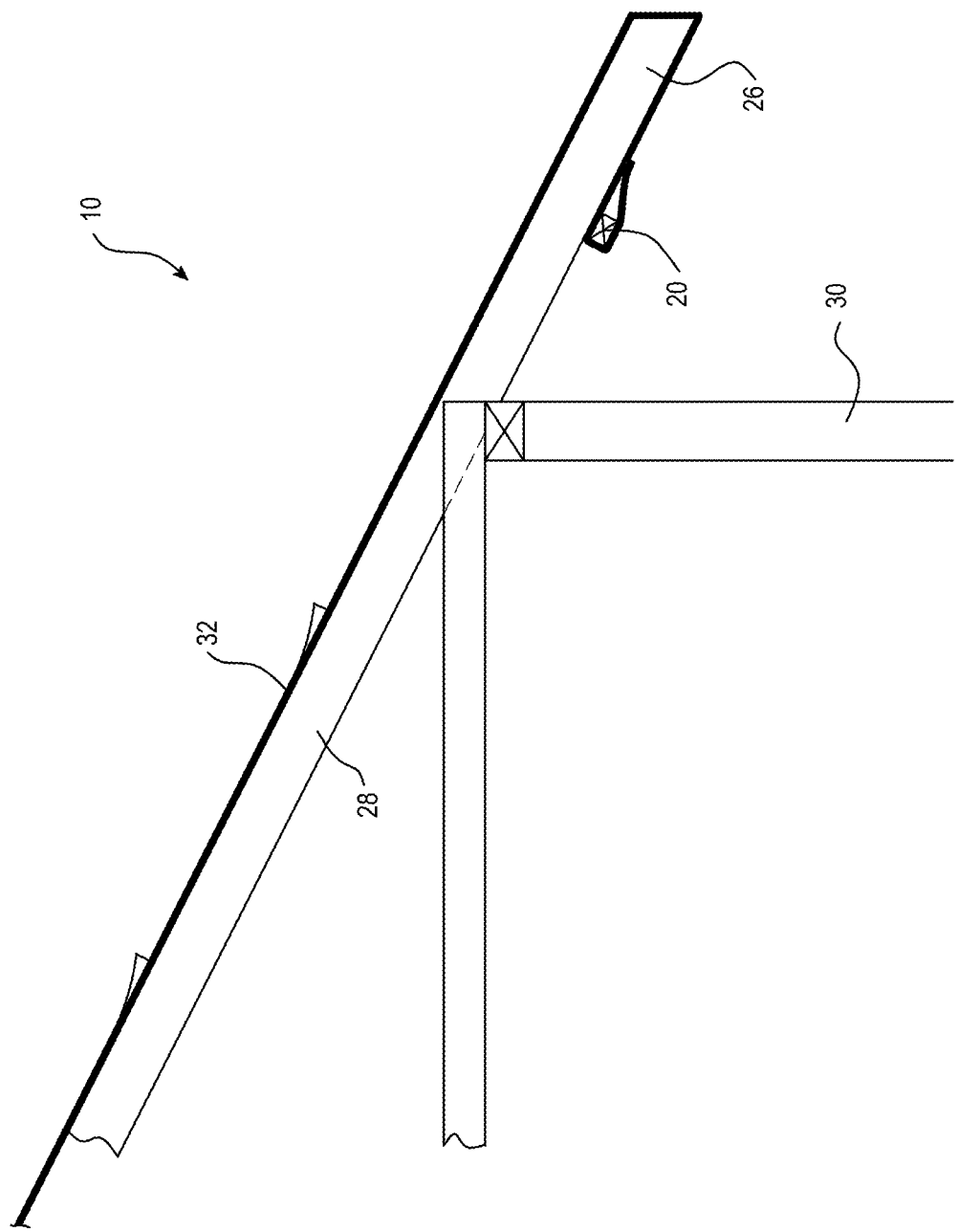
FIG. 3 is a side sectioned view of a portion of a partly completed building showing the application of a roof cover system of the invention to unclad roof framing.

In a third preferred embodiment of the invention, a heat shrinkable film may be applied to the roof framing of an uncompleted building. In this embodiment as shown in FIG. 3, the heat shrinkable film 18 is applied after the roof framing is complete but preferably prior to the attachment of facia boards.

In this embodiment also, lengths of film are prepared from suitable width rolls sufficient to stretch from one side of the roof to an opposite side. In this case the trailing and leading edges of the length of film are preferably attached by means of battens 20 fixed to the underside of the outer ends 26 of rafters 28, that is between the outer ends of the rafters 28 and the wall frame 30.

Figure 4:
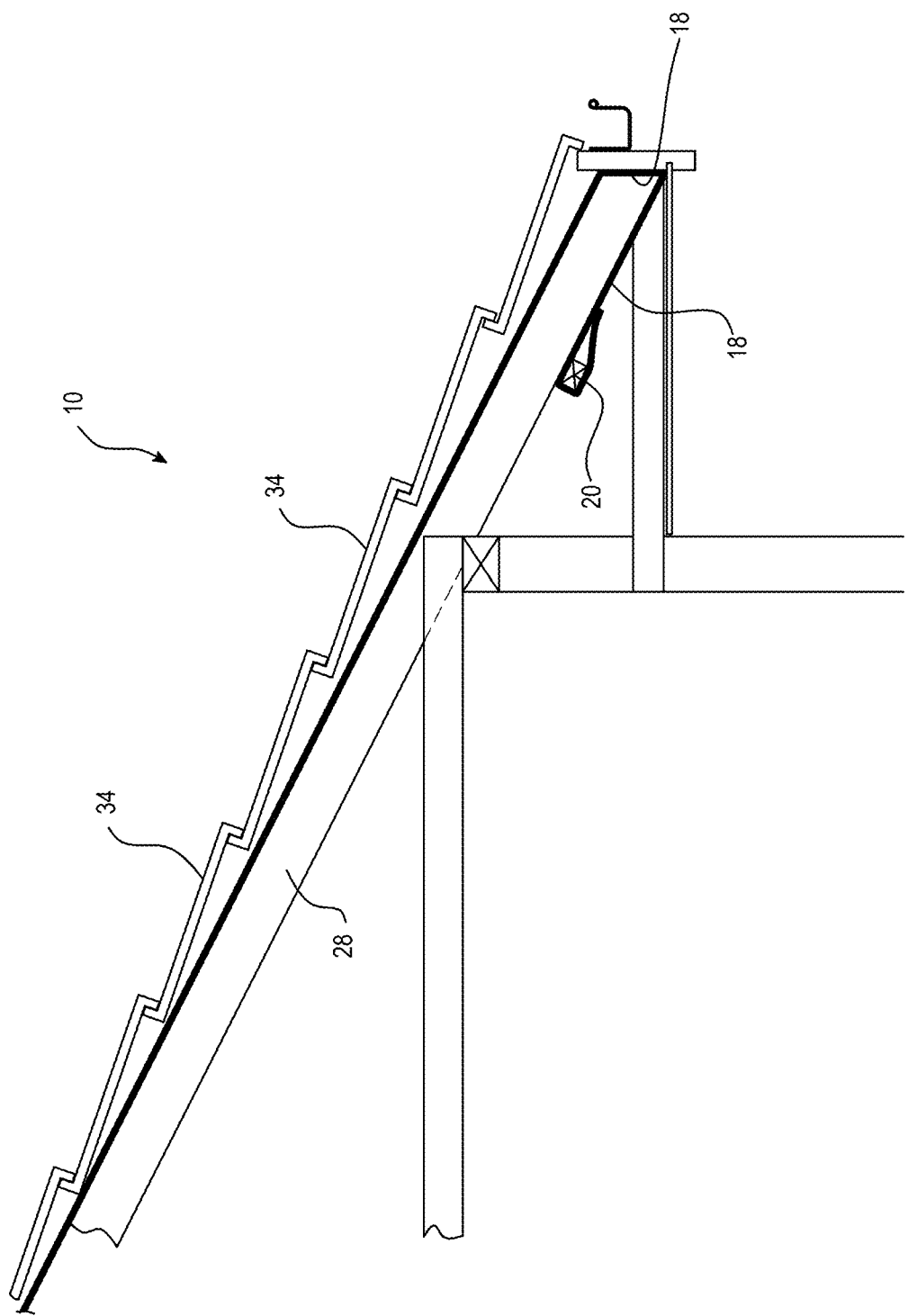
FIG. 4 is a further side sectioned view of the building of FIG. 3 showing the roof cover system of the invention functioning as a permanent sarking layer.

The heat shrinkable film 18 in this embodiment, is provided with a heat reflecting inner surface 32 so that the film 18 forms a permanent sarking layer behind the wall cladding or under the roof cladding, either tiles 34, as shown in FIG. 4, or metal sheeting. Thus in this embodiment the heat shrinkable film of the invention act both to protect the timberwork of a building under construction and provides a replacement for conventional reflective sarking.

The weatherproof nature of the heat shrinkable material applied in this way provides for internal work on the building to continue in the event of inclement weather, thus increasing productivity and economy of construction.

It will be understood that the method of application described in the second preferred embodiment above is also, indeed perhaps even more so, applicable to the present embodiment. In this case manipulating a roll of material and taping edges of lengths of material together over the open framework of the roof of a building under construction is even more difficult so that assembly on the ground, perhaps into a number of sheets, prior to placement over the roof framing, is clearly advantageous.

Figure 6:
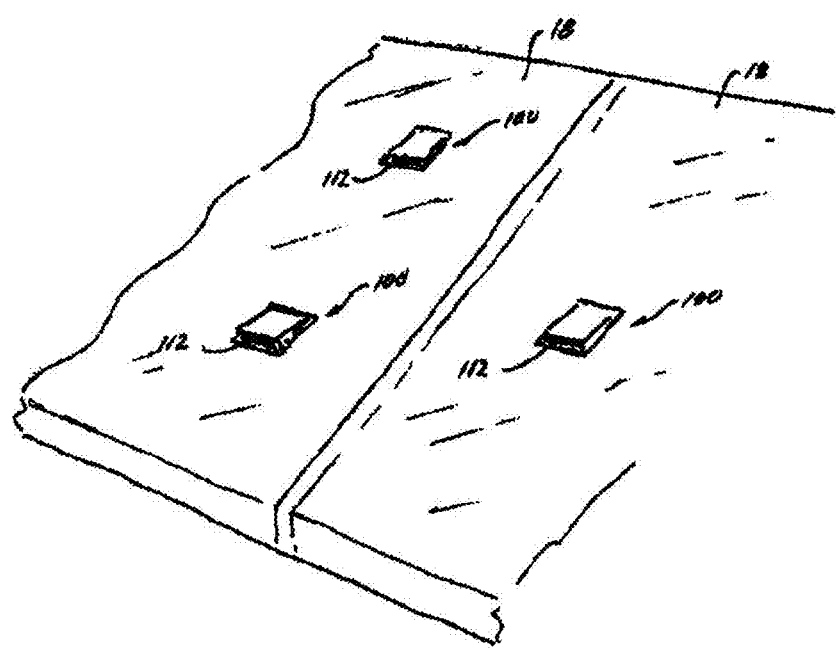
FIG. 6 is a perspective view of a portion of heat shrinkable material in position over a section of roof in which the sheets of material were prior prepared with air vents.
Figure 6A:
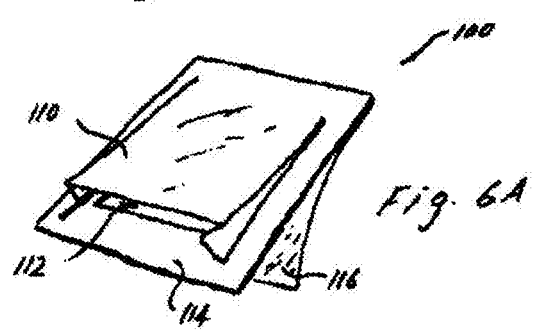
FIG. 6*a* is a perspective view of one preferred embodiment of the air vents of FIG. 6.
Figure 7:
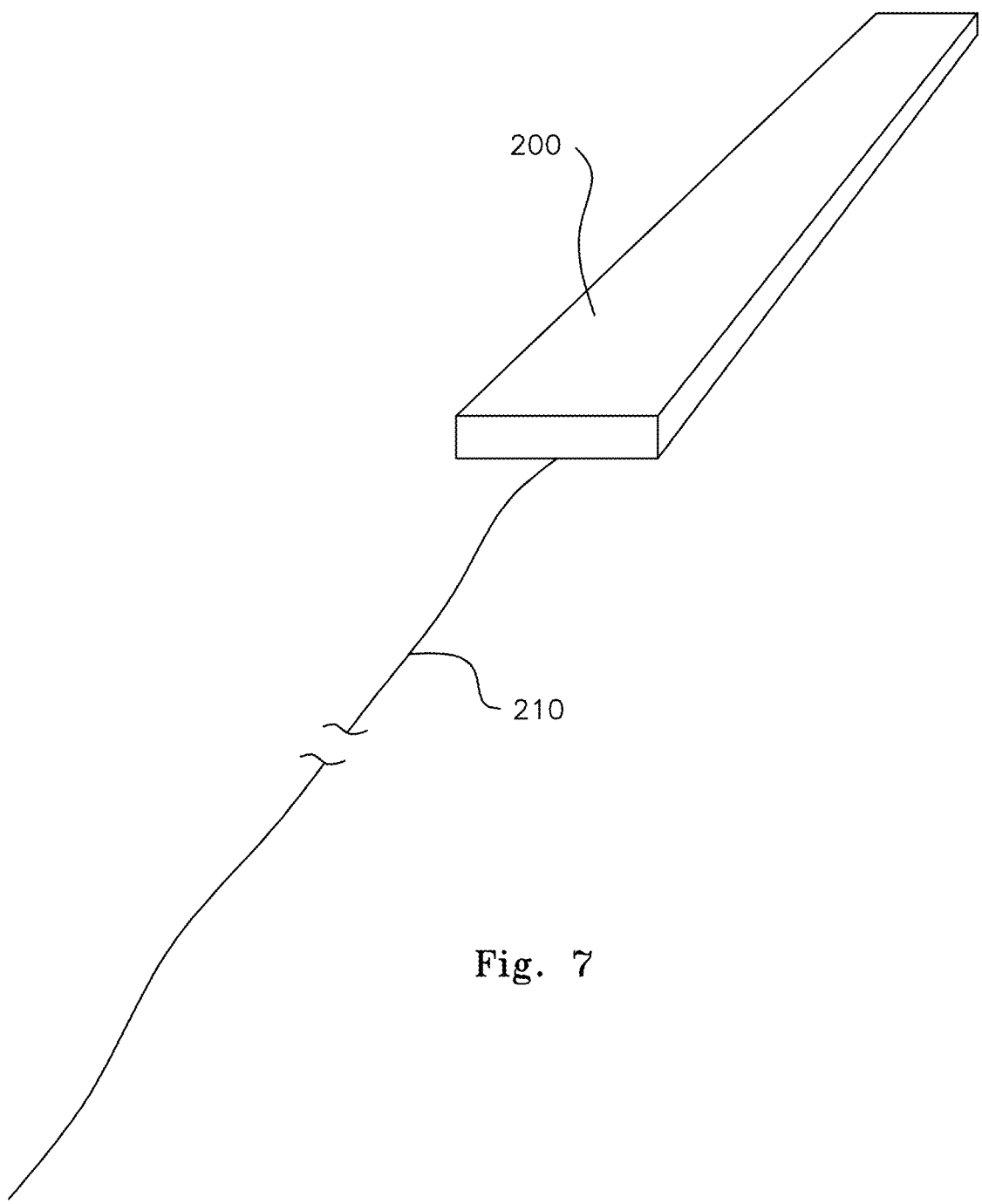
FIG. 7 is a perspective view of a supporting element laid out on a ground surface in preparation of assembly of lengths of material according to a fourth embodiment of the invention.

In each of the above described embodiments, the sheet of material may be further prepared, as shown in FIG. 6, by adding a distribution of air vents 100 at various locations in each of the strips 18. Preferably, the vents 100, as shown in FIGS. 6 and 6A, take the form of one-way covers or flaps 110 which are affixed over an aperture 112 cut into the strips of film 18 at the desired location. The flaps 110 are so arranged as to prevent the ingress of rainwater while allowing the passage of air.

In one preferred form the vent 100 is pre-formed of low density polyethylene and provided with a self adhesive base 114. To apply the vent 100 after the aperture has been prepared, a protective cover 116 is peeled off the adhesive layer of base 114 and the vent 100 pressed into position.

These vents allow the exhalation of air from underneath the sheet of material, either as a result of higher air pressure arising within the roof space, for example through rising warm air or through the ingress of wind, or due to negative pressure above the sheet material.

Fourth Preferred Embodiment

In the above described embodiments, in those cases where two or more adjoining lengths of heat shrinkable material were described as assembled into a sheet on a ground surface, the lengths of material were secured together by adhesive tape. While this can be adequate for temporary cover of a storm damaged structure for example, a stronger and, where required, a far stronger and more permanent solution is the heat welding of adjoining lengths of material along an overlap.

Nevertheless, prior to welding, it is preferable to hold the edge of the uppermost sheet of the overlap in place by adhesive tape to prevent problems in windy conditions.

With reference now to FIGS. 7 to 10, in the present invention, in one preferred arrangement an elongate support element 200 is laid at a convenient location on the ground surface on which the sheet is to be assembled. The support element 200 may comprise a length of timber or other, substantially heat resistant material, preferably 200 mm wide and somewhat longer than the length of weld in a weld sequence. The support element is provided with an attached rope or cable 210 of sufficient length to extend the length of the lengths of heat shrinkable material to be joined together. This rope or cable 210 is stretched out in line with the support element 200 and along the intended join between two lengths of the material.

Figure 8:
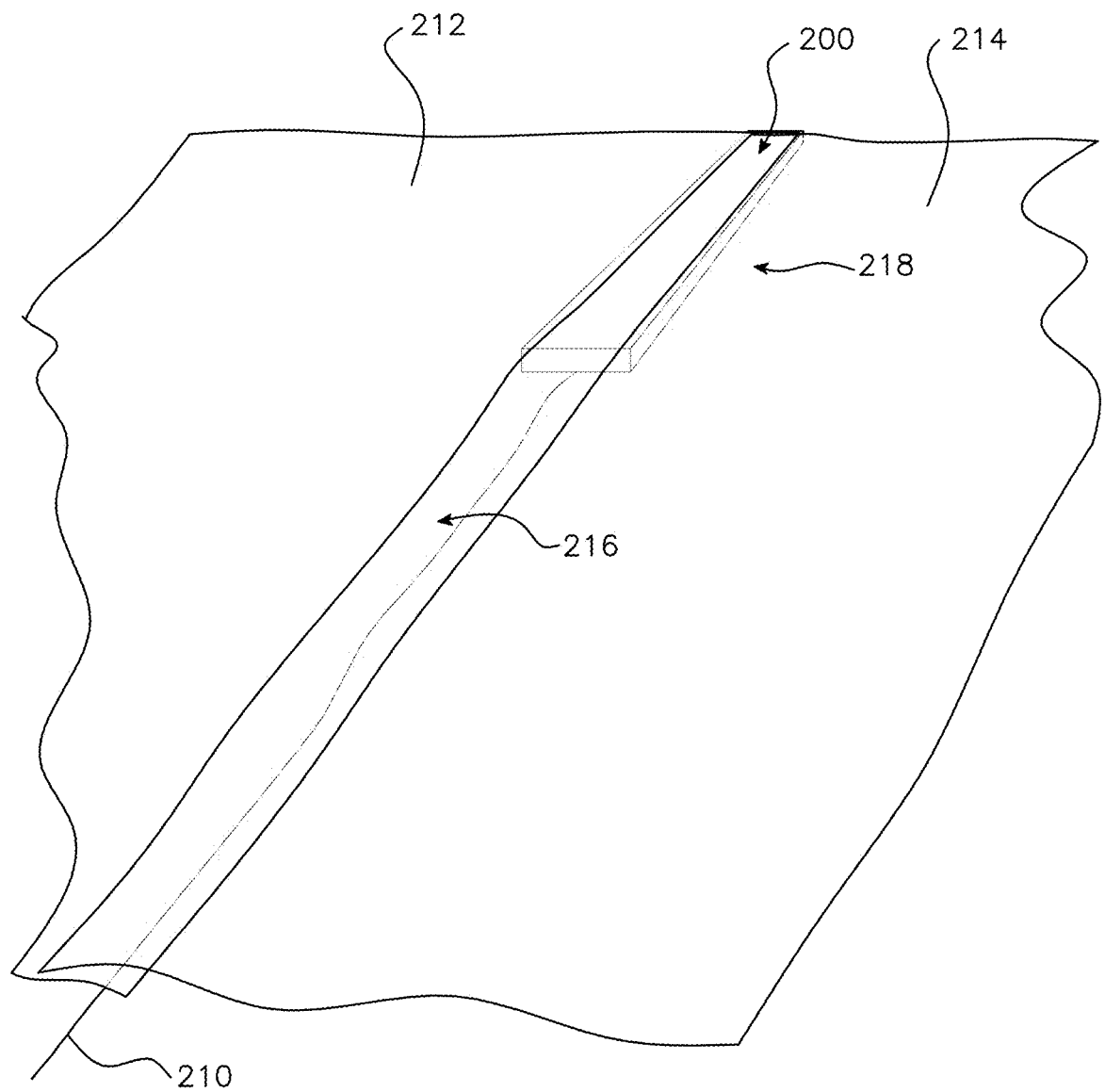
FIG. 8 shows portions of two adjoining, overlapped lengths of material laid out so that a first portion of the overlap lies over the supporting element of FIG. 7.
Figure 9:
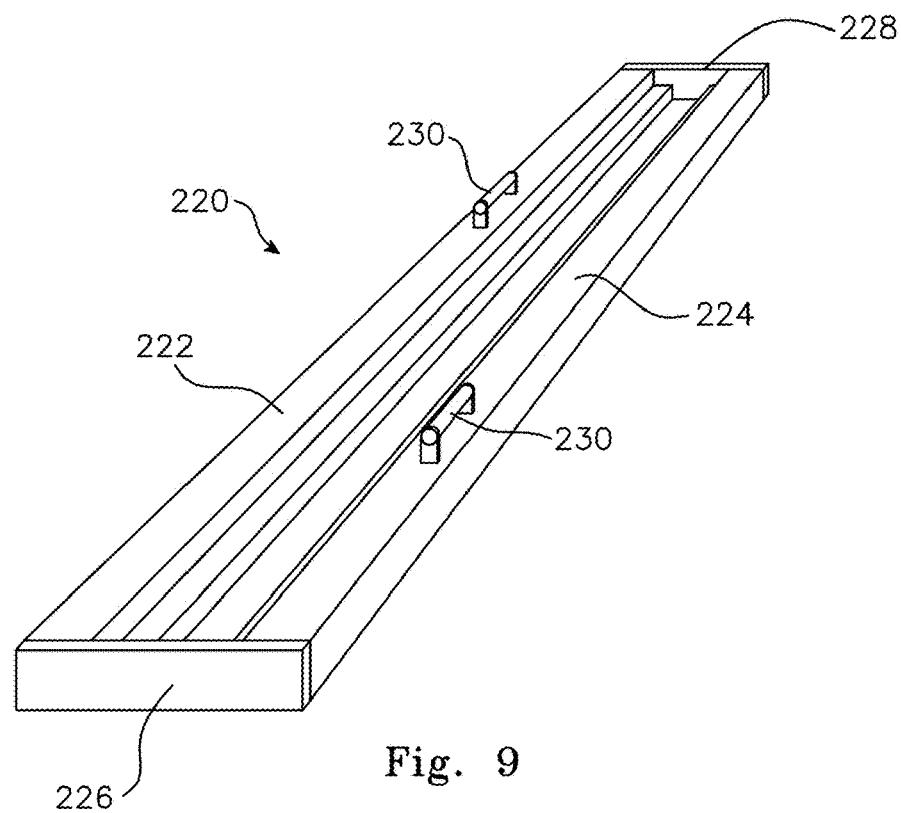
FIG. 9 is a perspective view of a guide rail assembly for use with the supporting element of FIG. 7.

As shown in FIG. 8, two adjoining lengths of heat shrinkable material 212 and 214 are then laid out side by side with an overlap 216 of approximately 150 mm over the supporting element 200 and the rope or cable 210, and so that the supporting element 200 underlies a first portion 218 of the overlap. Adhesive tape is applied to the outer edge of the overlap, at least for the first portion 218 of the overlap 216, if required.

Figure 10:
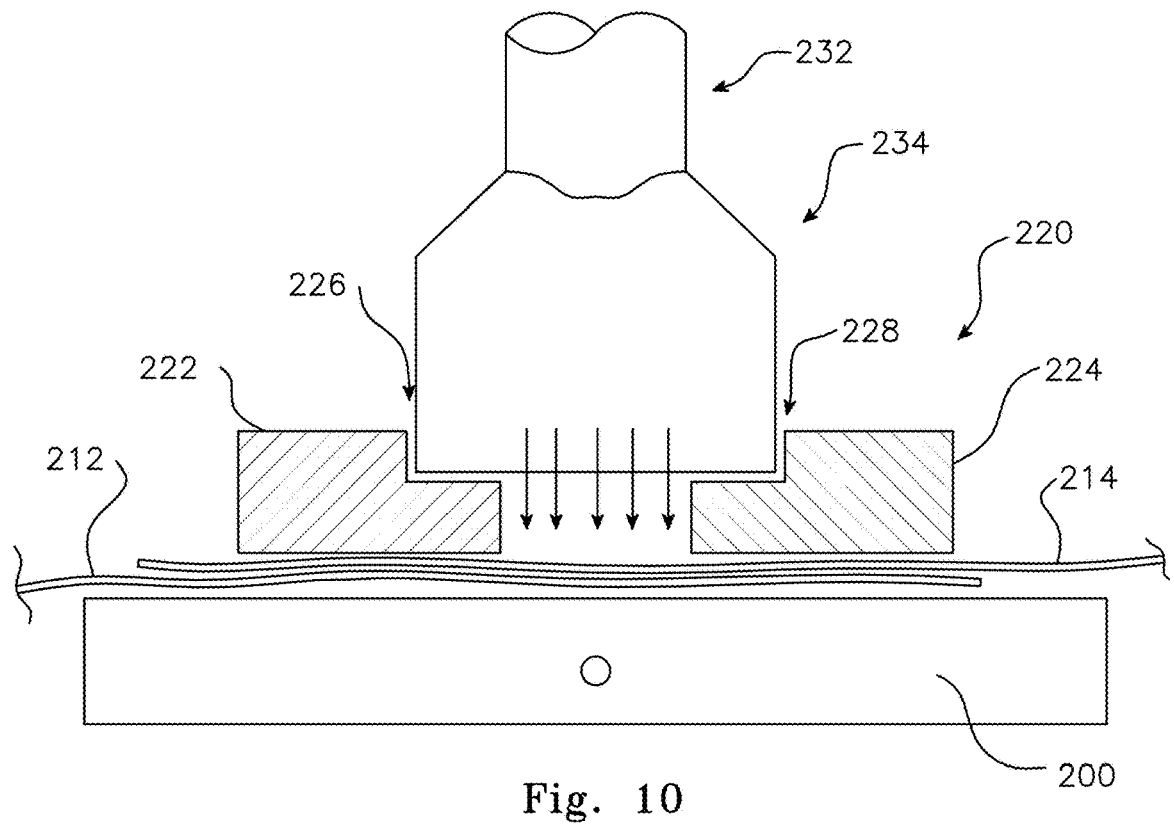
FIG. 10 is a cross section of the guide rail assembly of FIG. 9 showing a portion of a heat gun and the overlap of the two length of material supported on the supporting element of FIG. 7.

As shown in FIG. 10, a guide rail assembly 220 substantially coextensive with the supporting element, is then laid over and centrally along the first portion 216 of the overlap, with the guide rail assembly resting on the supporting element 200 so that the overlapping portions of the two lengths of material 212 and 214 are secured between the guide rail assembly 220 and the supporting element 200.

The guide rail assembly 220 comprises two, spaced apart, rigid rail elements 222 and 224, preferably 1 m in length but may be provided in various lengths, for example 300, 600 or 1200 mm. The rail elements 222 and 224 are interconnected at their outer ends by connection cross members 226 and 228. Preferably, the end profiles of the rail elements 222 and 224 are as shown in FIG. 10 with recessed inward facing edges 225 and 227 and are preferably spaced 20 mm apart. The recesses are so arranged to guide a heat source at a predetermined distance above the overlap. The rail elements 222 and 224 are formed of metal, steel or preferably aluminium. Finally, the rail assembly 220 is provided with at least one, preferably two grab handles 230 for manipulating the assembly in use.

A heat gun 232 (partly shown in FIG. 10) is provided with a heat directing shroud 234 sized in width to fit between the recessed edges 226 and 228 of the guide rail assembly 220 and a length sized to deliver a quantum of heat to an area of overlapping sheets of material between the rail assembly, sufficient to fuse that area together within a predetermined time duration.

The heat gun 232 with its attached shroud 234 in drawn along the guide rail assembly 220 at an even rate, thus fusing that length of overlap 216 covered by the rail assembly. In one preferred arrangement, the heat gun may be mounted on a trolley (not shown) which traverses the guide rail. The heat gun may be moved along the guide rail manually, or the trolley could be powered to give a controlled rate of movement.

The arrangement of the guide rail which controls the separation of the heat gun from the material, combined with a predefined rate of travel, assures the consistency and quality of the weld.

The supporting element 200 is then drawn with the rope or cable 210 into a next position along the sheet overlap and the guide rail assembly 220 repositioned accordingly. Heat is then applied to this next length of the overlap, and the process repeated until the required length of sheet assembly is reached.

In an alternative arrangement, the sheets of material may be laid out over a suitable ground surface such as for example a nearby car park or a suitably flat area of lawn. In this instance, the overlap portion is again secured prior to the welding process by the placement of the guide rail assembly over the overlap portion and the heat source applied as described above. After welding this first overlap portion, the guide rail assembly is positioned over a next overlap portion until a required length of sheet assembly is reached.

The air vents 100 referred to above and shown in FIG. 5, may be welded into the required locations in similar fashion. The cover piece of material forming the vent cover preferably overlaps three of the sides of the pre-cut aperture in the sheet of material sufficient for welding the overlap as described for the joining of the two lengths of material. These three sides of the piece of material forming the vent cover axe welded to the length of material around the pre-cut aperture, with the fourth side of the material arranged to overlap the aperture by a minimum of 300 mm.

The arrangement of this preferred embodiment allows for very secure, watertight and relatively accurate joining of adjoining lengths of the heat shrinkable material. The portion of overlap to be joined is held securely by the weight of the guide rail assembly while the guide rail profiles both a guide and control of the application of fusing heat.

The assembly of sheets is prepared for fastening to the roof by adding securing battens at least along two opposing edges after pulling the assembly up onto the roof surface to cover the damaged areas. The battens are then mechanically secured either to the eaves of the roof, the facia boards or, if the damage is restricted to a relatively small area of the roof, to battens of the roof structure.

In this latter case and for a tiled roof as shown in FIG. 11, a masonry drill bit is used to drill holes through tiles coincident with the underlying roof batten and fasteners driven through the securing batten, the tiles and into the roof batten. Once in position, the heat source is applied to the assembly of sheets to tighten the heat shrinkable material into conformity with the roof surface.

The heat shrinkable material, guide rail assembly, heat gun, tape and associated tools may be provided in kit form. In a preferred arrangement shown in FIG. 12, a box 40 is provided in which at least one, preferably two rolls 42, of the heat shrinkable material 44 are rotationally supported so as to allow the material to be drawn from the box. The box 40 is provided with a stop 46 which allows the lid 48 to be propped open leaving a narrow slit for the material 44 to be drawn through while at the same time providing a cutting guide for cutting the material when drawn out to a required length. The box is further provided with a compartment 50 for storage of the heat source and ancillary equipment (not shown).

Figure 12:
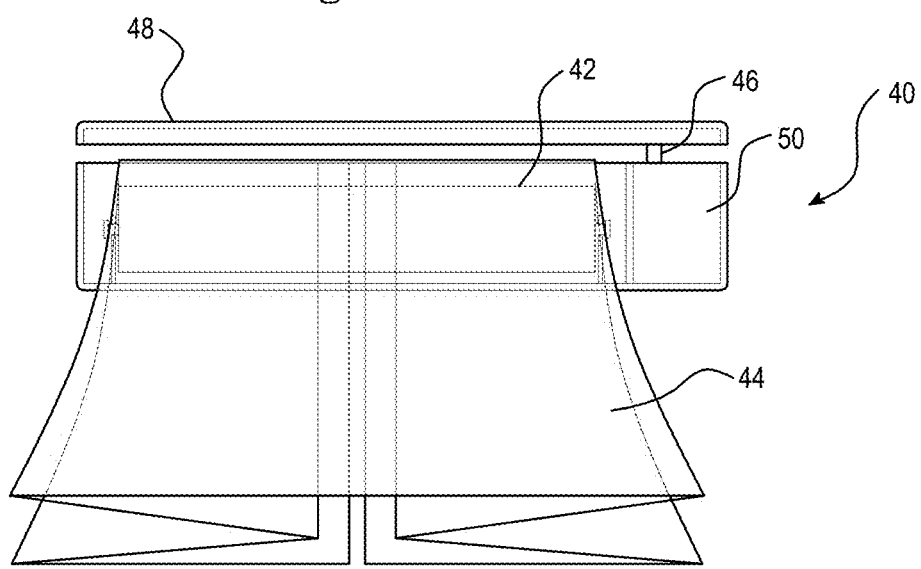
FIG. 12 is a view of a preferred arrangement of folding the heat shrinkable material for winding onto a dispensing roll rotationally supported in kit box.
Figure 15:
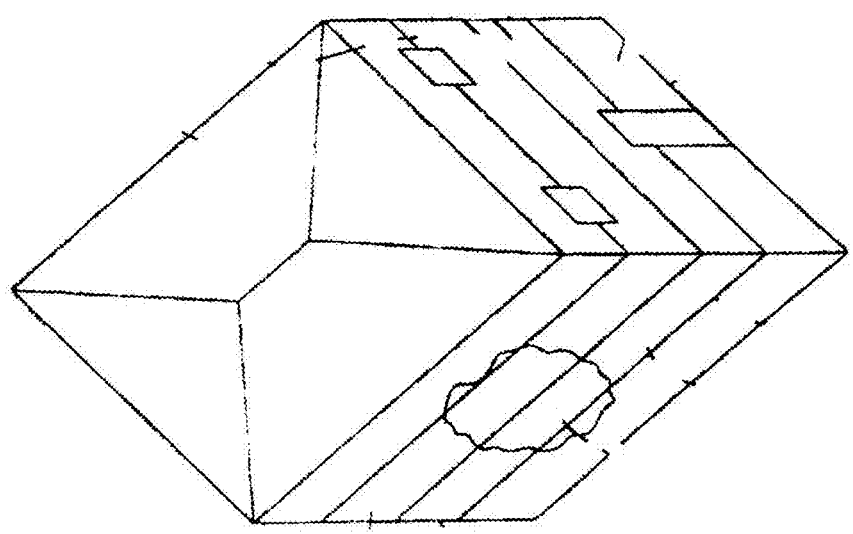
FIGS. 14 and 15 illustrate the use of an assembly of sheets of shrinkable material prepared according to the invention for application to the roof and wall structures of a building as a sarking layer.
Figure 14:
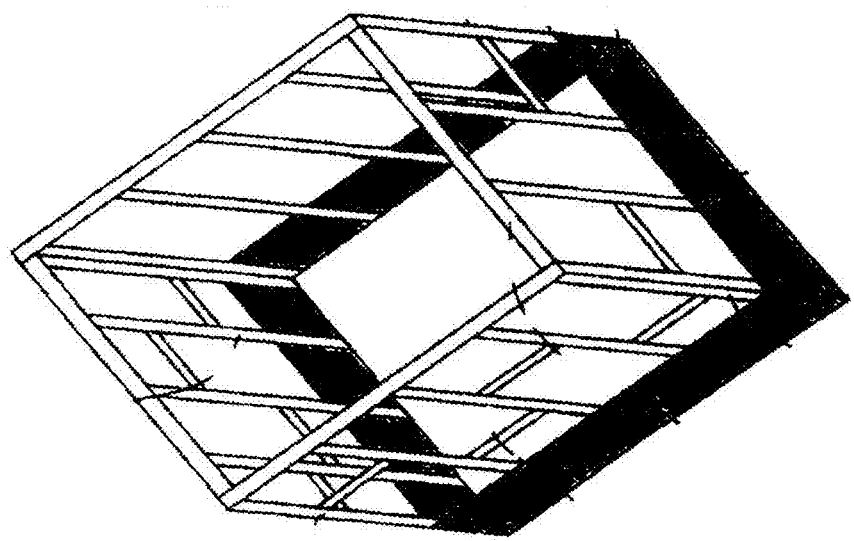

Preferably, the heat shrinkable material is wound onto the rolls 40 folded as shown in FIG. 12 so that when drawn from the box and opened out the sheet of material is approximately four times the width of the roll from which is was drawn.

It will be understood that the procedure of the assembly of lengths of the heat shrinkable material as described for this embodiment may equally be applied for the assembly of sheets of heat shrinkable material intended to form a sarking layer for the roof or walls of a building where the sarking layer is secured to the roof and wall framing before applying the roof and wall cladding.

In Use

In use, one or more kits are transported to a site where damage to a roof has occurred. The damaged area is measured and the number of lengths to cover the width and the length of the lengths of material determined. These lengths are drawn from the kit box and an initial two lengths placed side by side on the supporting surface, which may be directly on the ground or on a supporting element, with the required overlap, and the overlap welded as described above.

The welding process described in this embodiment of the invention has been proven to provide extremely strong welds, well able to withstand any conceivable wind load when applied to a roof or to the structure of a building under construction, as attested by the extract from a laboratory test report shown in FIG. 13. As well, wind tunnel testing has shown the welding process of the invention will withstand wind speeds of up to at least 160 Km/Hr.

Preferred Material Specification

A blend of LDPE resin & LLDPE resin (suitable resin examples Dowlex 2645 liner low density polyethylene (LLDPE) with a relative density of 0.918 & melt index of 0.85 mixed with Dow 303E low density polyethylene (LDPE) with a relative density 0.922 & melt index of 0.30. Best performance is a mixture of 65% LDPE & 35% LLDPE.

UV screen additive minimum 1 year

Non halogen Fire retardant additive (high quality that can be used on food grade manufacturing machines) Fire additive to meet the French M1 standard 200 micron in thickness (6 mil)

Roll length 131 ft (40 m)

Roll "lay-flat" width 16.4 feet (5 m)—Note roll to be concertina folded to an overall width of 1300 mm.

Film rolled onto heavy duty 3' inch (76 mm) cardboard cores.

Each roll to weigh 83.67 pound (37.5 kg)

Stormseal logo to be printed on the film logo size—3 ft wide (1000 mm)×10 inches high (250 mm) printed in a repeat manner.

Film to have a minimum 40% shrink capability

High edge tear resistance

Minimum ultimate tensile strength 1000 pound per yard (450 kg per meter)

Application as Wall Sarking

Select the correct width roll as it is important to have the least amount of welds in the sealing process.

Site measure the area which to be sealed.

Ensure any sharp object are padded.

Attach one side of the shrink wrap to the inside edge of perimeter stud work. Securely fix by a continuous batten.

Take the leading edge of the said film across to the Opposite the structure.

Securely fix off the opposite side by continuous batten.
Apply heat to the film wrapped stud in a continuous even pattern with a similar motion of a spray paint gun.
Allow time for the film to shrink on to itself.
Repeat this process to all vertical wall surfaces.
Now using the heat gun extension tool apply an even continuous heat to the entirety of the vertical wall surface allowing enough passes for the shrink wrap to contract.
Continue this process with overlapped joints of 300 mm until the structure is covered entirely.
For wall penetrations such as windows and doors cut the plastic as required.
Allow to cut around alt wail penetrations allowing a minimum of 300 mm rise around all penetrations. Apply heat to ensure the film shrinks back onto the sub structure allowing a watertight seal.
Ensure all edges are sealed.
Continuously check for burn holes and patch as required.
For vertical impact damaged areas a sub structure frame will be required for the shrink wrap to be applied over. This is a simple batten type frame with diagonal bracing securely fixed to the structure.
Uses Include
Wall insulation and draught elimination.
Asbestos removal and disposal.
All weather protection during construction to eliminate lost time.
Cost effective weather seal for storm Impact damaged buildings and or structures on vertical surfaces.
Replacement/substitution for Vertical tarpaulins installations.
Vertical timber framework protection during construction.
Benefits
Cost effective replacement for wall sarking/insulation. Reflective surface provides excellent thermal qualities.
Provides excellent thermal insulation on walls.
Ensures kiln dried structural framework is not exposed to weather conditions eliminating structural movement.
Provides a dust free environment when removing asbestos.
Reduces residual cost and time during re construction of storm Impact damaged buildings and or structures.
Eliminates inclement weather days after main structure is in place therefore assisting productivity.
No ongoing hire cost as is for tarpaulins.
Eliminates the need to re attend sites to secure tarpaulins during the reconstruction process.

The invention claimed is:

1. A system for providing covers for surface areas of built structures;
the system including a film of heat shrinkable material for stretching and heat shrinking over one or more of the surfaces of the built structure;
the film formed as a sheet comprising an assembly of lengths of the heat shrinkable material prepared on a supporting surface; characterized in that the sheet is prepared by applying heat to overlap portions between adjoining lengths of the heat shrinkable material while the overlap portions are secured in contact between the supporting surface and a guide rail assembly laid over the overlap portions;
the guide rail assembly comprising guide rail elements positioned in direct contact with an upper surface of the overlap portions;
the overlap portions welded together by a heat gun moveable along the guide rail assembly at a predetermined distance above the overlap portions; the heat gun provided with a heat directing shroud; width of the heat directing shroud sized so as to fit between edges of recesses provided in the guide rail elements of the guide rail assembly.

2. The system of claim 1 wherein the supporting surface is a ground surface.

3. The system of claim 1 wherein the supporting surface is a surface of a supporting element placed on a ground surface.

4. The system of claim 1 wherein guide rail elements of the guide rail assembly are spaced apart; the guide rail elements interconnected at their outer ends by connecting elements.

5. The system of claim 4 wherein spacing between the guide rail elements is in the range of 15 to 30 mm.

6. The system of claim 3 wherein the supporting element comprises a length of heat resistant material.

7. The system of claim 3 wherein the supporting element is provided with a length of rope or cable attached to one end of the supporting element; the length of rope or cable being at least the length of a length of overlap of two adjoining lengths of the heat shrinkable material.

8. The system of claim 1 wherein a length of the heat directing shroud is sized to provide fusion of a portion of the overlap of the two adjoining lengths of heat shrinkable material in a predetermined time.

9. The system of claim 1 wherein consistency and quality of a weld is ensured by separation between the heat gun and the overlap of material and a predefined rate of travel of the heat gun along the guide rail.

10. The system of claim 2 wherein undersides of the rail elements of the guide rail assembly are provided with strips of a heat insulating material.

11. The system of any previous claim wherein at least one air vent is provided in any of the lengths of heat shrinkable material; the air vent comprising an aperture and an overlying cover.

12. The system of claim 9 wherein three sides of material comprising the overlying cover overlap three edges of an aperture and are welded to the surface of the length of heat shrinkable material; a fourth side of the overlying cover overlapping a fourth edge of the aperture by at least 300 mm.

* * * * *